US009765805B2

(12) United States Patent
Pond

(10) Patent No.: US 9,765,805 B2
(45) Date of Patent: Sep. 19, 2017

(54) BRACKET ASSEMBLY AND SYSTEMS

(71) Applicant: Gary J. Pond, Milwaukee, WI (US)

(72) Inventor: Gary J. Pond, Milwaukee, WI (US)

(*) Notice: Subject to any disclaimer, the term of this patent is extended or adjusted under 35 U.S.C. 154(b) by 195 days.

(21) Appl. No.: 13/781,089

(22) Filed: Feb. 28, 2013

(65) Prior Publication Data
US 2013/0232758 A1 Sep. 12, 2013

Related U.S. Application Data

(60) Provisional application No. 61/607,085, filed on Mar. 6, 2012.

(51) Int. Cl.
F16B 17/00 (2006.01)
F16B 7/18 (2006.01)
E04B 1/26 (2006.01)
A47B 47/00 (2006.01)

(52) U.S. Cl.
CPC ............ F16B 17/00 (2013.01); E04B 1/2612 (2013.01); F16B 7/185 (2013.01); A47B 47/0016 (2013.01); E04B 2001/2676 (2013.01); Y10T 29/4997 (2015.01); Y10T 29/49826 (2015.01); Y10T 29/49952 (2015.01); Y10T 29/49963 (2015.01); Y10T 403/7039 (2015.01); Y10T 403/7041 (2015.01)

(58) Field of Classification Search
CPC ........ F16B 17/00; F16B 7/185; E04B 1/2612; E04B 2001/2676; A47B 47/0016; Y10T 403/7039; Y10T 403/7041; Y10T 29/49826; Y10T 29/49947; Y10T 29/49952; Y10T 29/49963

USPC ......... 29/428, 525, 525.01, 525.02; 403/174, 403/175, 178, 187, 232.1, 361
See application file for complete search history.

(56) References Cited

U.S. PATENT DOCUMENTS

| 755,116 | A | * | 3/1904 | Dreyer | E04B 1/2403 |
| | | | | | 248/224.8 |
| 949,394 | A | * | 2/1910 | Daly | E04B 1/2403 |
| | | | | | 135/909 |
| 1,117,158 | A | * | 11/1914 | Bernartz et al. | A47G 33/12 |
| | | | | | 248/524 |
| 1,225,431 | A | * | 5/1917 | Gelbart | 5/285 |
| 2,765,087 | A | * | 10/1956 | Weinbaum | A47B 57/06 |
| | | | | | 182/186.5 |
| 3,499,631 | A | * | 3/1970 | Heldenbrand | E04H 17/1413 |
| | | | | | 256/25 |

(Continued)

FOREIGN PATENT DOCUMENTS

| JP | 06136872 | | 5/1994 | | |
| JP | 06136872 | A * | 5/1994 | ............... | E04B 7/00 |

(Continued)

OTHER PUBLICATIONS

KR 20100106431; EPO English Translation; pp. 1-7.*

Primary Examiner — Christopher Besler
Assistant Examiner — Bayan Salone
(74) Attorney, Agent, or Firm — Quarles & Brady LLP

(57) ABSTRACT

A bracket assembly for use in constructing a support frame. The bracket assembly has an inner support sleeve section and at least one support arm that is attached to the inner sleeve support section, wherein the support arm is attached to the inner support sleeve section without the use of additional fasteners. The invention also is directed towards kits and methods that include the bracket assembly.

18 Claims, 9 Drawing Sheets

(56) References Cited

U.S. PATENT DOCUMENTS

| | | | | |
|---|---|---|---|---|
| 4,053,246 A * | 10/1977 | Uccello | | A47B 57/54 211/182 |
| 4,094,417 A * | 6/1978 | Cairnes | | 211/183 |
| 4,192,623 A * | 3/1980 | Borg | | 403/232.1 |
| 4,351,621 A * | 9/1982 | Liou | | 403/217 |
| 4,498,801 A * | 2/1985 | Gilb | | 403/232.1 |
| 4,576,302 A * | 3/1986 | Smolik | | 220/3.5 |
| 4,923,176 A * | 5/1990 | Heinz | | E04H 17/1421 256/21 |
| 5,101,932 A * | 4/1992 | Trudgeon | | 182/129 |
| 5,289,665 A * | 3/1994 | Higgins | | E04B 1/2403 211/191 |
| 5,372,448 A * | 12/1994 | Gilb | | 403/231 |
| 5,439,269 A * | 8/1995 | Cheng | | 297/440.1 |
| 5,503,493 A * | 4/1996 | Kato | | E04H 5/12 403/230 |
| 5,555,694 A * | 9/1996 | Commins | | 52/702 |
| 5,603,580 A * | 2/1997 | Leek et al. | | 403/232.1 |
| 5,605,410 A * | 2/1997 | Pantev | | F16B 7/0486 403/174 |
| 5,653,546 A * | 8/1997 | Cronkhite | | E04H 17/1413 248/219.3 |
| 5,961,242 A * | 10/1999 | Leone | | 403/234 |
| 6,039,307 A * | 3/2000 | De Zen | | 256/19 |
| 6,219,989 B1 * | 4/2001 | Tumura | | E04B 1/2403 52/274 |
| 6,367,749 B2 * | 4/2002 | Valiulis | | 248/188 |
| 6,450,107 B1 * | 9/2002 | Sanz Novales | | 108/153.1 |
| 6,523,321 B1 * | 2/2003 | Leek | | E04B 1/2612 52/289 |
| 6,659,677 B1 * | 12/2003 | Exposito | | 403/24 |
| 6,682,253 B2 * | 1/2004 | Binna | | A47B 57/26 211/182 |
| 6,802,496 B1 * | 10/2004 | Preta | | 256/65.04 |
| 6,837,016 B2 * | 1/2005 | Simmons | | E04B 1/2403 403/173 |
| 6,893,008 B2 * | 5/2005 | Forbis | | E04F 11/1817 256/65.02 |
| 6,974,276 B2 * | 12/2005 | Kirchner | | A47B 57/54 211/182 |
| 7,007,363 B2 * | 3/2006 | Forbis | | 29/428 |
| 7,121,530 B1 * | 10/2006 | Preta | | E04H 17/1413 256/65.01 |
| 7,306,203 B2 * | 12/2007 | Platt | | 256/65.14 |
| 7,334,372 B2 * | 2/2008 | Evans | | E04B 1/2612 52/289 |
| 7,637,076 B2 * | 12/2009 | Vaughn | | E02D 27/34 403/169 |
| 7,886,674 B2 * | 2/2011 | Behnke | | 108/150 |
| 8,108,978 B2 * | 2/2012 | Van Zile, III | | B23K 37/0443 269/45 |
| 8,132,519 B2 * | 3/2012 | Behnke | | 108/150 |
| 8,152,404 B2 * | 4/2012 | Berg | | 403/356 |
| 8,250,827 B2 * | 8/2012 | Lin et al. | | 52/702 |
| 8,443,569 B2 * | 5/2013 | Sias | | E04B 7/063 248/300 |
| 8,453,414 B2 * | 6/2013 | Simmons | | E04B 1/2403 403/169 |
| 8,745,954 B2 * | 6/2014 | Simmons | | E04B 1/2403 403/169 |
| 8,782,994 B1 * | 7/2014 | Simmons | | E04B 1/2403 403/169 |
| 2004/0026679 A1 * | 2/2004 | Terrels et al. | | 256/65.03 |
| 2005/0127346 A1 * | 6/2005 | Steffes | | 256/65.05 |
| 2005/0155307 A1 * | 7/2005 | Timony | | 52/506.01 |
| 2006/0165482 A1 * | 7/2006 | Olberding | | 403/381 |
| 2007/0006462 A1 * | 1/2007 | Van Zile, III | | B23K 37/0443 29/897.2 |
| 2007/0119108 A1 * | 5/2007 | Downard | | 52/289 |
| 2007/0125929 A1 * | 6/2007 | Behnke | | 248/558 |
| 2007/0294979 A1 * | 12/2007 | Lin et al. | | 52/702 |
| 2008/0172976 A1 * | 7/2008 | Carney et al. | | 52/702 |

FOREIGN PATENT DOCUMENTS

| | | | | |
|---|---|---|---|---|
| JP | 2004068519 | | 3/2004 | |
| JP | 2004068519 A | * | 3/2004 | E04B 9/18 |
| JP | 2007198069 | | 8/2007 | |
| JP | 2007198069 A | * | 8/2007 | E04B 1/58 |
| KR | 101497177 B1 | * | 2/2015 | E04B 2/761 |

* cited by examiner

BRACKET ASSEMBLY AND SYSTEMS

RELATED APPLICATIONS

This application claims the benefit of provisional patent application Ser. No. 61/607,085 filed Mar. 6, 2012.

BACKGROUND OF THE INVENTION

The present invention relates to frames and support structures and more particularly to bracket assemblies used for quick and easy assembly of frame and support structures.

Non-permanent support structures are used in a wide range of settings. For example, these structures can be used as wood storage racks, temporary storage crates, stages and runways, and other structures that may need to be efficiently assembled.

Permanent support structures are used in a wide range of settings. For example, these structures can be used as decks, sheds, lofted beds, and other structures that may need to be efficiently assembled. Prior art structures have been developed but have shortcomings. Generally, these structures require many parts and components for assembly, and these structures are not easily adaptable for various modular arrangements. Likewise, adjustment of the dimensions of the designed structure is not easily carried out with prior art systems and brackets.

In addition, prior art brackets cannot be assembled together before adding beams or fasteners, making many structure assemblies more time-consuming than necessary.

SUMMARY OF THE INVENTION

The present invention comprises a bracket assembly that allows for quick and efficient erection of a support assembly. The bracket assembly generally consists of two general components, an internal support sleeve and one or more support arms extending from the internal support sleeve. The support arms are removable from the support sleeve, thereby allowing the bracket assembly to be used as a corner, end, or side bracket.

The present invention also provides for a support structure kit. The kit generally comprises a plurality of bracket assemblies. The kit further comprises a plurality of support sections that will be attached to the brackets to form a support structure. The support sections are preferably made of wood. The kit may optionally include additional fasteners to reinforce the structure.

The present invention also discusses methods of constructing support structures using the bracket assemblies and kits of the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
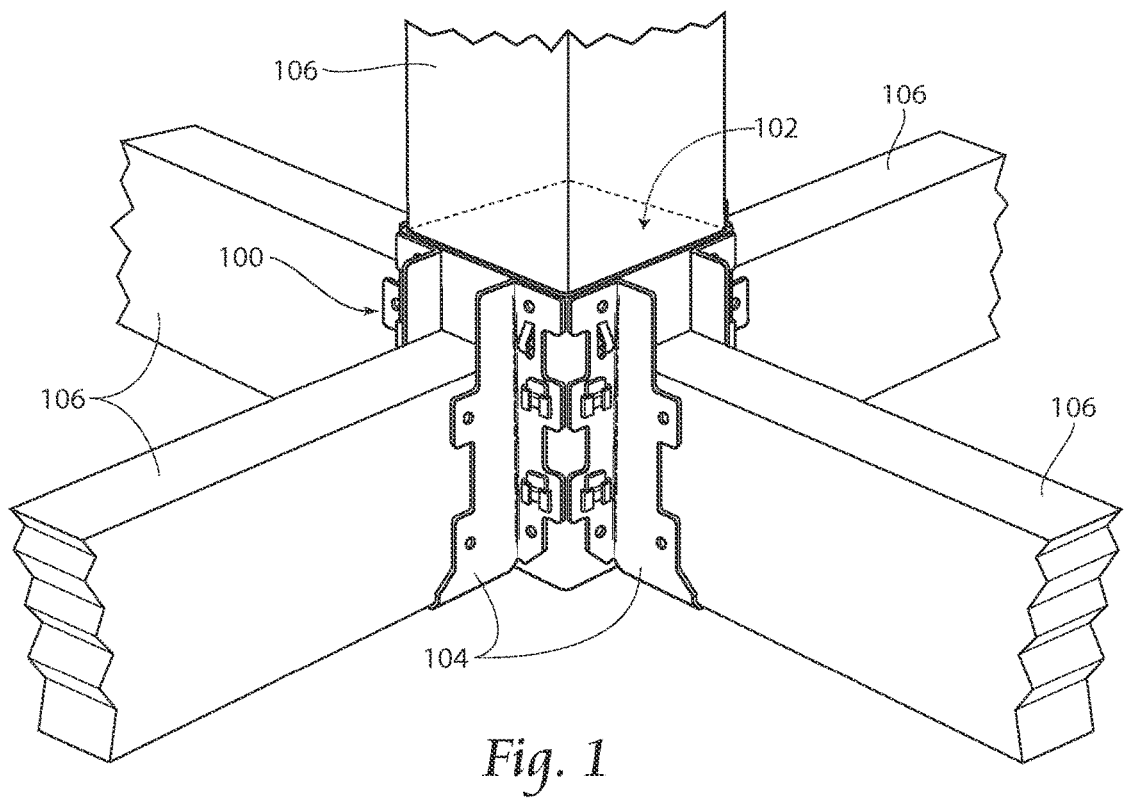
FIG. 1 is a perspective view of a bracket assembly designed according to the present invention, with a plurality of support sections extending from the bracket assembly.

FIG. 1 depicts a bracket assembly 100 according to the present invention. The bracket assembly 100 generally comprises an internal support sleeve 102 and a plurality of support arms 104 extending from the internal support sleeve 102. Each of the support arms 104 provides support for a support section 106. Depending on the positioning of the bracket assembly 100 when eventually constructing a structure (see, e.g. FIG. 5) the number of support arms 104 will be adapted accordingly. That is, if the bracket assembly 100 is to be used as a corner bracket, e.g. corner bracket 12 in FIG. 5, the internal sleeve 102 will have two support arms 104 attached to the internal sleeve 102. If the bracket assembly 100 is to be used as a center bracket, e.g. center bracket 14 in FIG. 5, three support arms 104 will be added to the internal support sleeve 102.

The inner support sleeve section is shown in FIG. 1 as having four sides for convenience; however the invention is not limited to four-sided support beams. The inner support sleeve section may have any convenient number of sides greater than or equal to three sides for receiving the support arm brackets. The inner support sleeve may also be circular, to conveniently fit on a tree or telephone pole.

Figure 2:
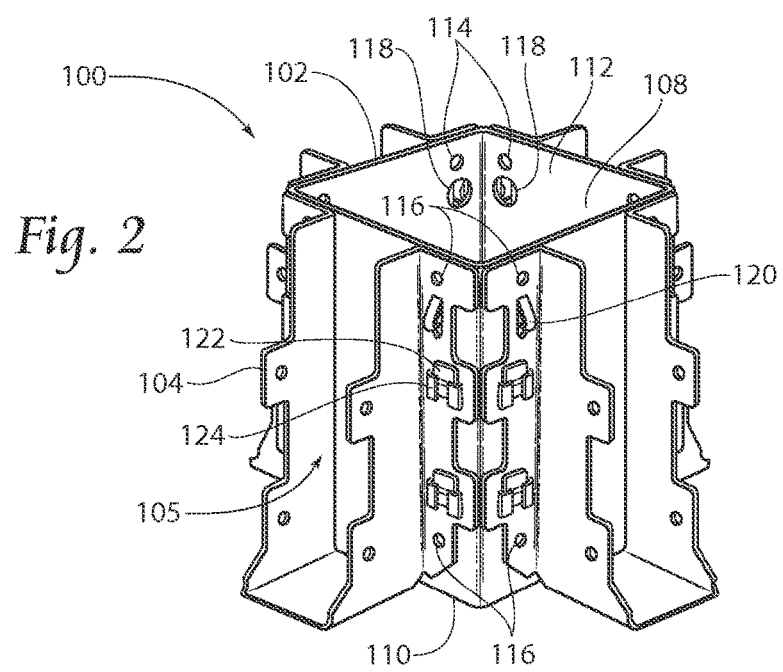
FIG. 2 is a perspective view of the bracket assembly of FIG. 1.

FIG. 2 depicts a perspective view of the bracket assembly 100. The internal support sleeve 102 has an open end 108 and a closed end 110, thereby forming a cavity 112 for receiving a support section 106, as shown in FIG. 1. The internal support sleeve 102 also has a plurality of openings 114, which correspond to a plurality of openings 116 located on one of the respective support arms 104. The openings 114, 116, allow for a fastening device, e.g. a screw, to be inserted into a support section 106 for fastening and securing the bracket assembly 100 to a particular support section 106. Preferably the openings 114, 116 are symmetrically arranged, e.g. located at the corners of the respective element. The support section 106 comprises an elongated board structure, preferably made of wood. The internal support sleeve 102 also has a plurality of secondary holes 118 that correspond to tabs 120 located on each of the support arms 104, with the secondary holes 118 and the tabs 120 being discussed further, below.

Still referring to FIG. 2, the internal support sleeve 102 has a plurality of upwardly extending support tabs 122 that will correspond to tab retainers 124 located on each of the support arms 104. The support tabs 122 extend upwardly, relatively parallel to the internal support sleeve 102. The support tabs 122 allow the support arms 104 to be retained by the internal support sleeve 102 in a secure, but removable fashion. The arrangement allows for the easy addition and removal or support arms 104 from the internal support sleeve 102 as necessary, depending on the particular requirements for a particular bracket assembly 100.

FIG. 2 also shows the support arms 104 with a plurality of fastener holes 126 so that the support arms 104 can be attached to the support sections 106 by way of a fastener, e.g. a screw. As shown, the support arms 104 have at least one open side in the structure that receives the support sections 106, which allows the support sections to be easily inserted into a cavity 105 formed by the support arm 104. While the cavity 105 may be completely enclosed on all four sides, it is preferable to have a structure as disclosed, e.g. two side walls and a base.

Figure 3:
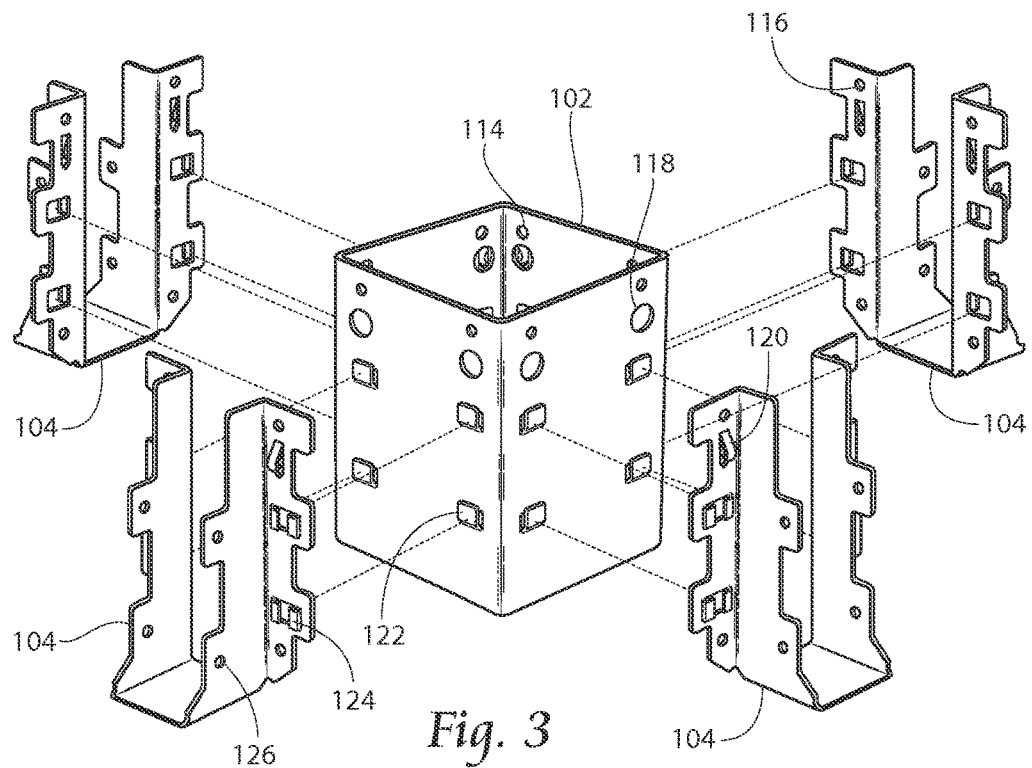
FIG. 3 is an exploded view of the bracket assembly of FIG. 2.

FIG. 3 provides an exploded view of the bracket assembly 100 of FIG. 2. As noted above, the openings 114 of the internal support sleeve 102 correspond to the openings 116 located on support arms 104. The secondary holes 118 of the internal support sleeve 102 correspond with the tabs 120 located on the support arms 104. Each of these arrangements will be used to attach the bracket assembly 100 to one of the support sections 106. Each of the support arms 104 is also arranged to be attached to one of the perspective support sections 106 by inserting a fastener into one of the fastener holes 126.

FIG. 3 also shows how the inner support sleeve 102 and the support arms 104 are attached to one another. The tab retainers 124 will interact with the support tabs 122. That is, the tab retainers 124 will be slid over a corresponding support tab 122 until the tab retainer 124 abuts the bottom of the support tab 122. The arrangement securely retains each of the support arms 104 on the internal support sleeve 102, but also allows the addition or removal of individual support arms 104, as necessary. No further fasteners are needed for the support arms 104 to be retained by the inner support sleeve 102. Such an arrangement allows for a secure attachment of the elements in any position, e.g. if the bracket assembly 100 was inverted or rotated horizontally or vertically.

The ability and adaptability of the bracket assembly 100 to be quickly assembled and for various shaped brackets, e.g. corner brackets, side brackets, and center brackets, thereby quickly erecting a storage structure. FIGS. 4-11 demonstrate a storage assembly 10 being erected using the bracket assembly 100 of the present invention.

Figure 4:
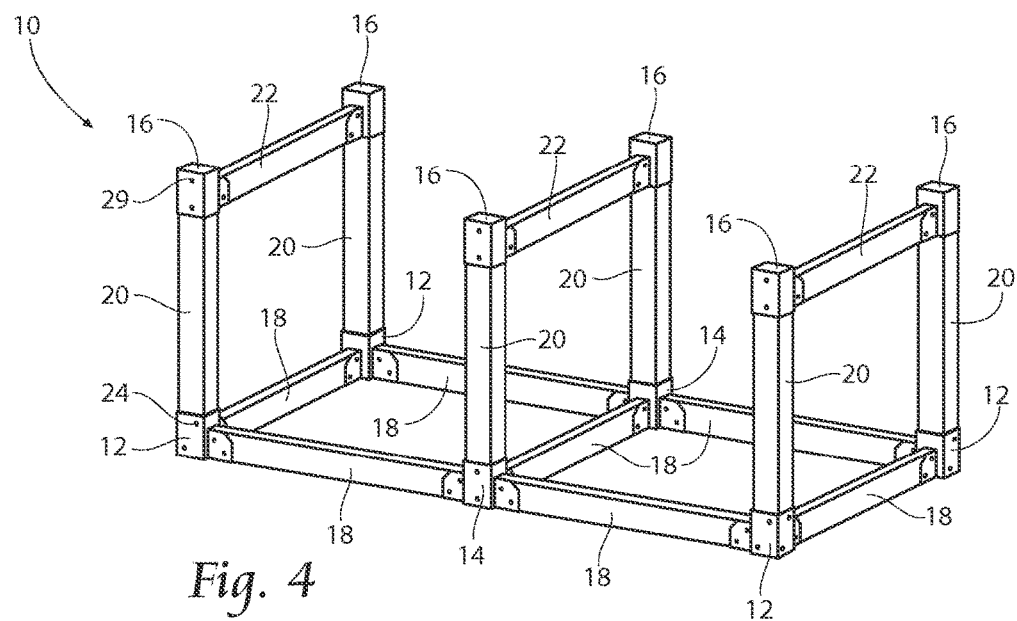
FIG. 4 is a perspective view of a support structure according to the present invention being used to construct a storage device, e.g. a wood storage assembly.

FIG. 4 shows the storage assembly 10 arranged according to the present invention for storing and stacking fire wood. The assembly 10 generally comprises a plurality of corner brackets 12, center brackets 14 and end brackets 16. Each of the brackets 12, 14, and 16, is a bracket assembly 100, with the corresponding number of support arms 104 added to the inner support sleeve 102, as discussed above. It should be understood that the brackets 12, 14, and 16 are shown as generally depicting bracket assemblies 100. A plurality of base supports 18, upright supports 20, and upper supports 22 are connected together by the brackets 12, 14, and 16. The supports 18, 20, and 22 correspond to the support sections 106, discussed above. The storage assembly 10 could be formed from a kit, which would include bracket assemblies 100 and various support sections 106.

Figure 5:
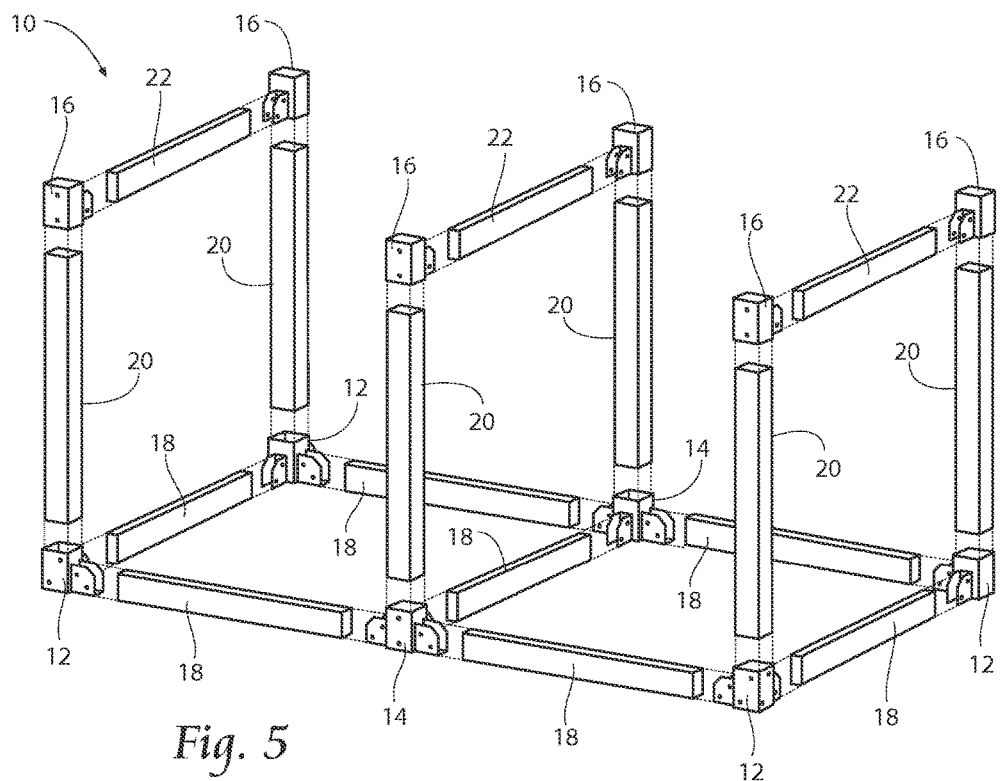
FIG. 5 is an exploded view of the wood storage assembly shown in FIG. 4.

FIG. 5 provides an exploded view of the storage assembly 10. The particular arrangement of the assembly 10 comprises four corner brackets 12, two center brackets 14, and six end brackets 16. The assembly 10 is shown comprising six base supports 18, six upright supports 20 and three upper supports 20. Each of the individual supports fittingly engages one of the brackets. That is, the ends of the brackets are designed to receive a respective end of one of the supports. Securing means 24, such as screws, nails, bolts, or other similar devices can be used to further secure the various sections of the assembly 10 together.

Figure 6:
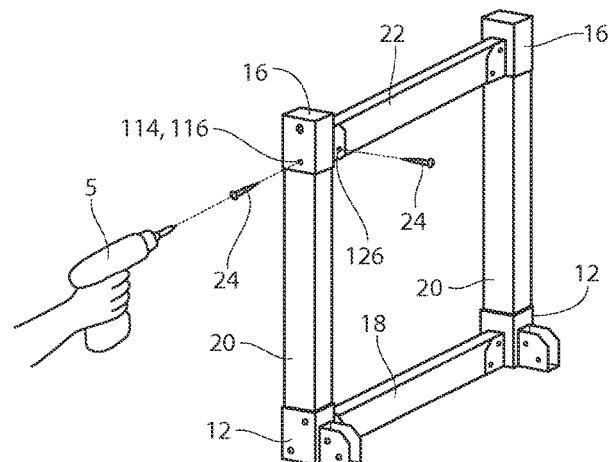
FIG. 6 is a perspective view of a partially assembled storage assembly of the present invention.
Figure 7:
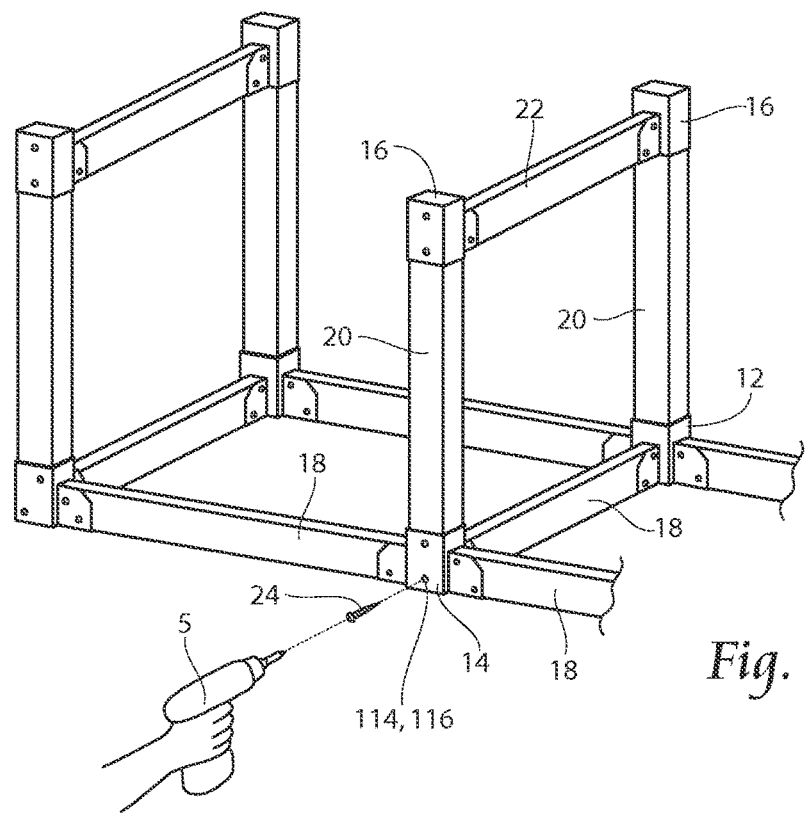
FIG. 7 is a perspective view of the storage assembly of FIG. 6 in a further assembled view.

FIGS. 6 and 7 demonstrate construction of the assembly 10. FIG. 6 shows the support 18 being mated with opposing corner brackets 12. A respective upright support 20 is mated with a respective one of the brackets 12, by way of the cavity 112 shown and described in the bracket assembly 100 (FIG. 1-3). Each of the supports 18 will be further mated with a respective bracket 16, with each of the support arms 106 (see FIGS. 1-3) of the brackets 16 being mated with an upper support. Securing means 24 will then be used to secure the various supports to the various brackets. As an example, a drill 5 can be used to screw in the securing means 24, i.e. screws. For example, the securing means allows the particular bracket to be secured to the supports through the openings 114/116 and 126, as discussed with respect to the bracket assembly 100 in FIGS. 1-3.

FIG. 7 shows a further step in construction of the assembly 10, with the central brackets 14 being secured to supports 18. The central bracket 14 can be screwed onto the supports 18, using the drill 5 to screw in the screws 24 through the openings 114/116 of the bracket 14, i.e. a particular arrangement of the bracket assembly 100.

Figure 8:
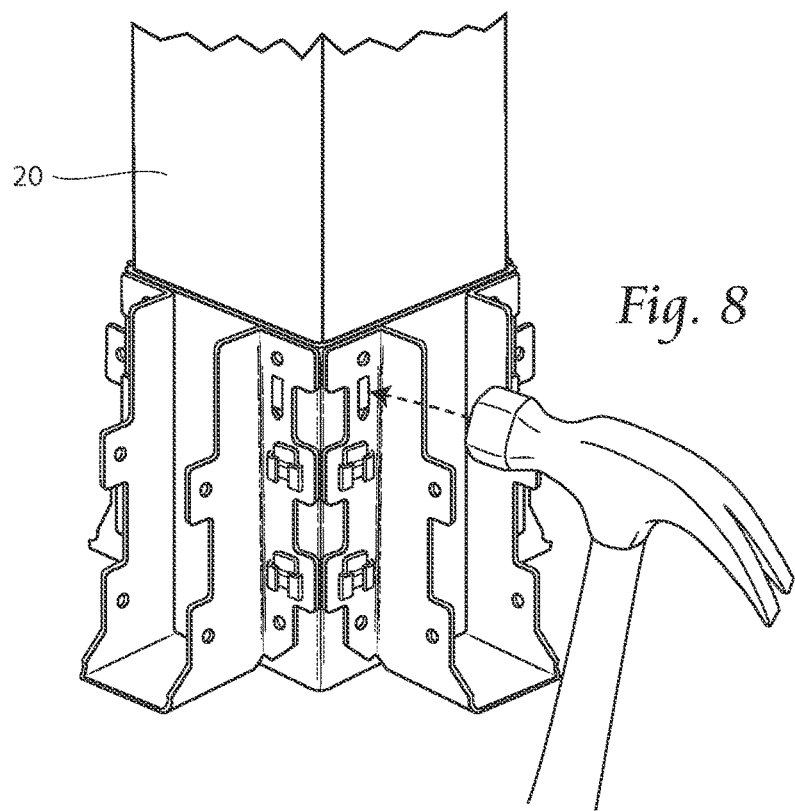
FIG. 8 demonstrates another step in constructing a storage assembly according to the present invention.

FIG. 8 provides another step in forming the assembly 10. A hammer will be used to flatten the tab 120 into the support 20 through the opening 118, thereby providing a secondary level of retention of the brackets onto the particular support. That is, the barb at the end of the tab 120 cross through the opening 118 and will then intersect the support 20 to further secure the bracket assembly 100 to the support 20.

Figure 9A:
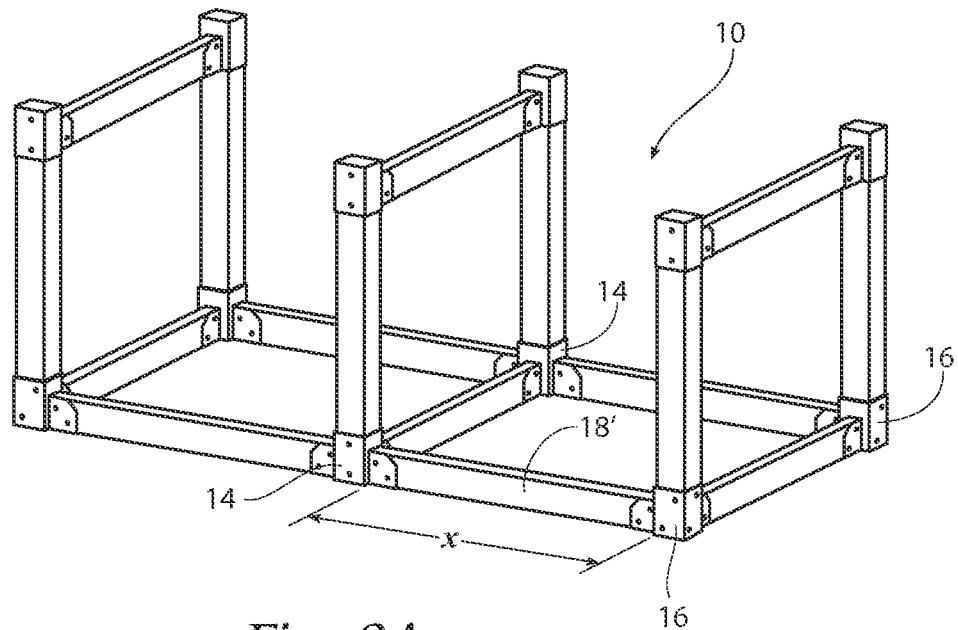
FIG. 9A is a finished storage assembly according to the present invention.
Figure 9B:
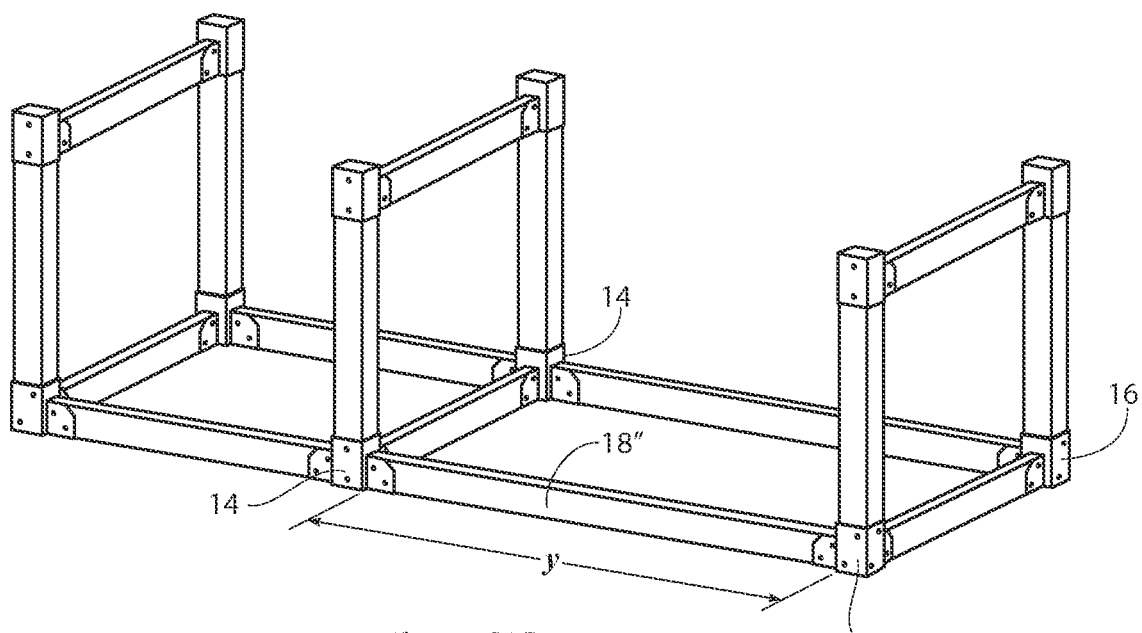
FIG. 9B is a partial sectional view of a storage assembly according to the present invention, demonstrating that the assembly can be adapted for alternate sizes and arrangements.

FIGS. 9A and 9B depict fully constructed assemblies 10. The assemblies 10 are generally alike, with the exception of the length of the support 18' (FIG. 9A) and the support 18" (FIG. 9B). The support 18' is shown as having a length x, which is shorter than the length y, depicted for the support 18". Because the supports are preferably made of wood or a wood substrate, the user will be able to adjust the length of the supports for the user's individual needs by cutting or sawing the support 18 to a particular length. Similarly, because the supports 18 are preferably designed as being of a standard size, such as a 2"×4", the length of the supports 18 can be easily adjusted by sawing or cutting the supports 18 to a desired length.

Figure 10:
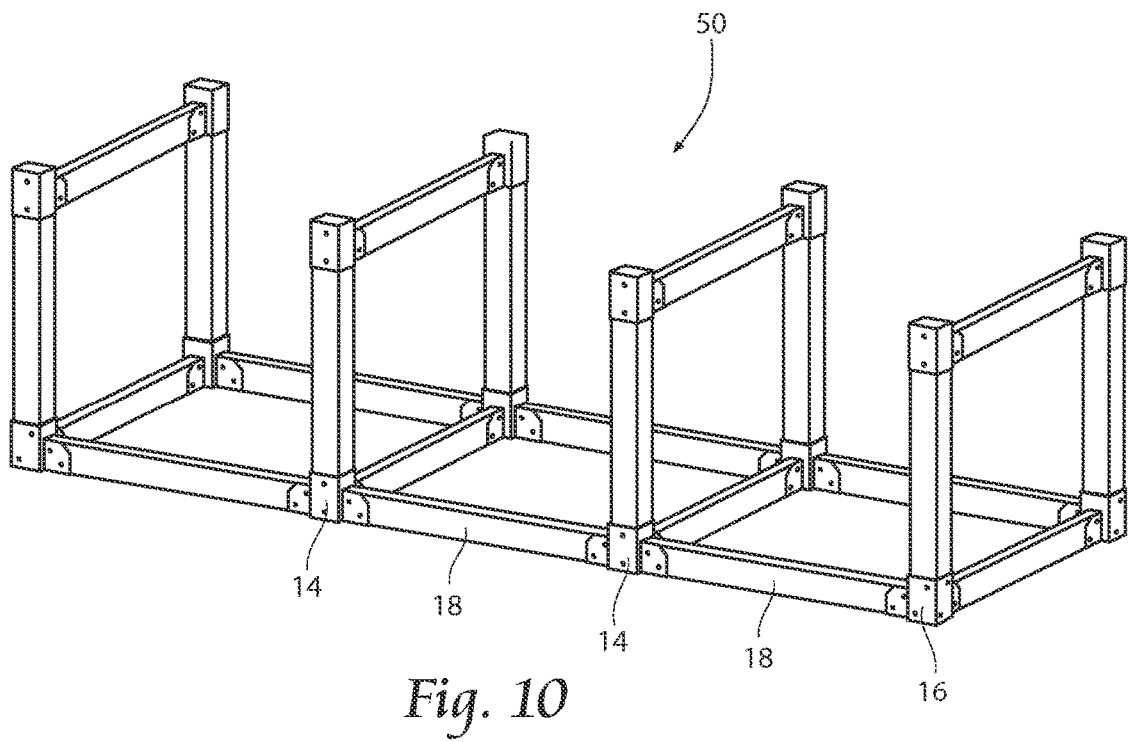
FIG. 10 is an alternate arrangement for a support assembly constructed according to the present invention.

FIG. 10 shows an assembly 50 which has an extended length and section compared to the assemblies 10. It is possible that more supports 18 could be used to extend the length of the assembly 50. Instead of one central bracket 14 used on each side of the assembly 50, there are two central brackets 14 located on each side of the assembly 50. The design shown in FIG. 10 could be the original design and kit for the assembly 50, or the assembly 50 could be formed by adding on to the assembly 10. The brackets 12, 14, and 16 are formed as discussed with respect to FIGS. 1-3, wherein the desired number of support sections 104 are added to the inner support sleeve 102 to form the particular bracket. As noted with respect to FIGS. 1-3, however, the brackets 12, 14, and 16 are based on the same bracket assembly 100. As such, the corner bracket 12 shown in FIG. 4 could be converted into the central bracket 14 shown in FIG. 5 by adding another support arm 104 to the inner support sleeve 102, which forms the main section of both brackets 12 and 14. The extra support 70 could then be screwed into a respective upright support 20, so that the structure could be extended as shown in FIG. 9. Potentially, the assembly 10 or 50 could be extended as needed, or as described below, could be erected in various shapes and designs.

Figure 11:
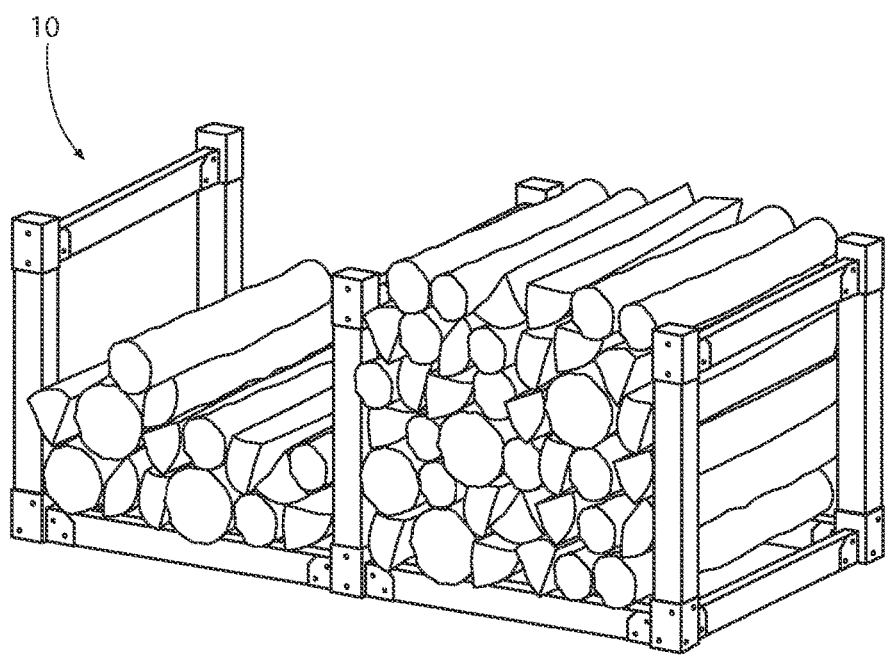
FIG. 11 depicts a completed wood storage assembly according to the present invention, shown supporting firewood.

FIG. 11 shows the assembly 10 supporting a plurality of logs or fire wood. The assembly 10 provides an easy to construct structure that can be adjusted and adapted to suit one's individual needs. Furthermore, because the individual components that make up the assembly 10 are relatively standard in size and shape, assembly effort is minimized compared to prior art assemblies that are directed more towards the aesthetic aspects of the assemblies. The upright supports 20 are preferably 4"×4" wood boards, while the base supports 18 and the upper supports 22 are preferably 2"×4" or 2"×6" or 2"×8" wood boards. It is intended that the bracket assembly 100 of the present invention will be used with these or other sized boards and lumber. The assembly 10 is preferably part of a kit, which would include instructions for assembling the assembly 10. Because all of the various sections of the assembly 10 are preferably designed so that they fit together with one another in perpendicular arrangements, the assembly 10 requires minimal measuring or tools for assembly. The kit would generally comprise a plurality of bracket assemblies 100. The kit could further include a plurality of support sections 106.

Figure 12:
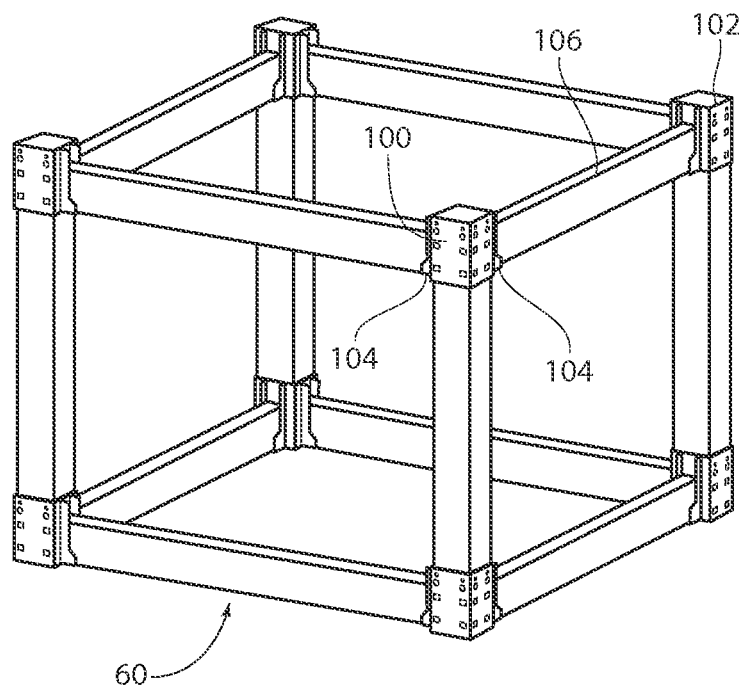
FIG. 12 depicts an alternate device, e.g. a crate, formed according to the present invention.

FIG. 12 further demonstrates the adaptability of the present invention. A crate 60 is formed using multiple bracket assemblies 100 of the present invention, in combination with support arms 104, and assemble as describe above. The crate 60 is easily constructed with each of the support sections 106 secured to the support arms 104, as described above, as well as being secured to the inner support sleeves 102, also described above.

Figure 13:
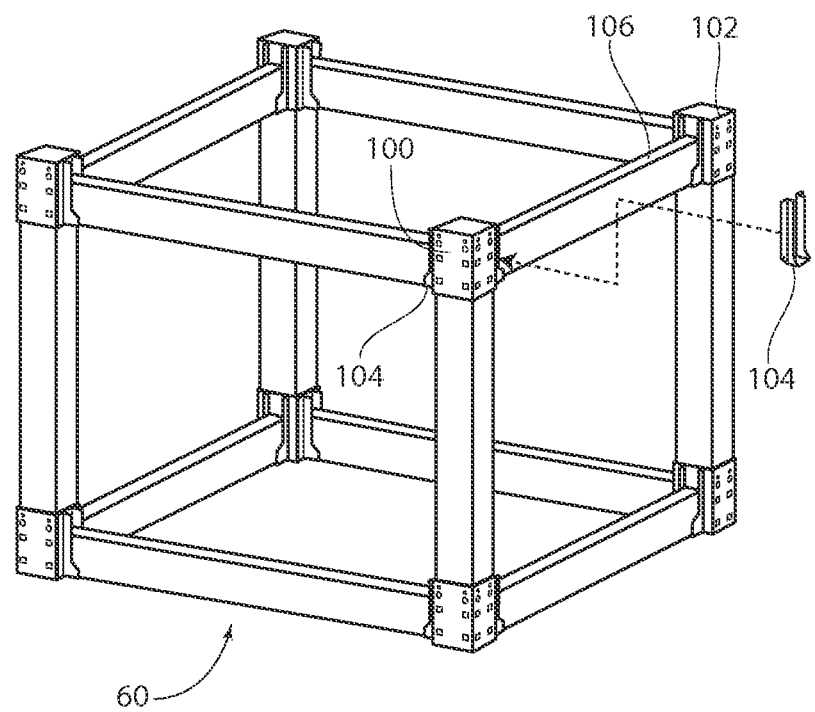
FIG. 13 depicts a further step in creating a structure according to the present invention.
Figure 14:
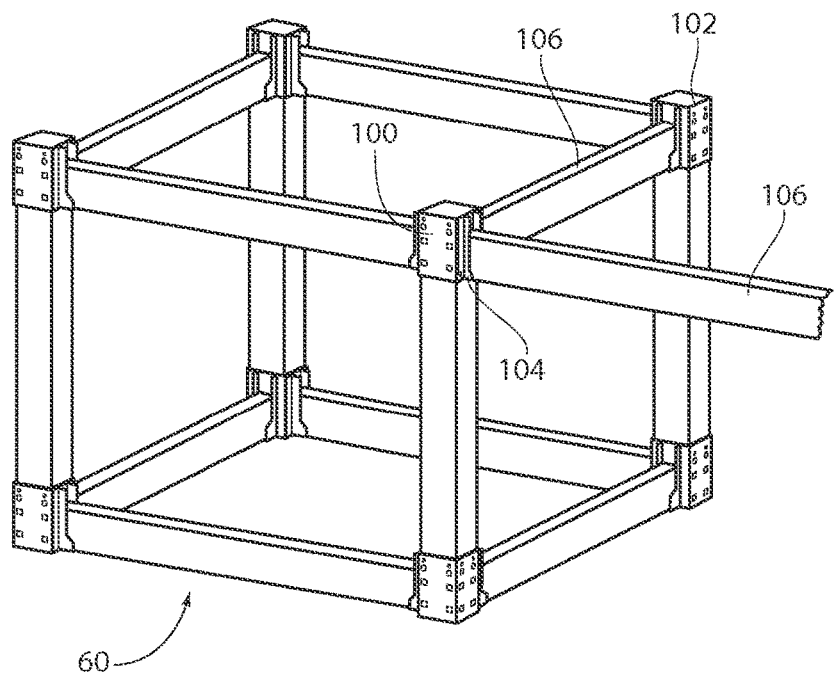
FIG. 14 depicts another step in creating a structure according to the present invention.
Figure 15:
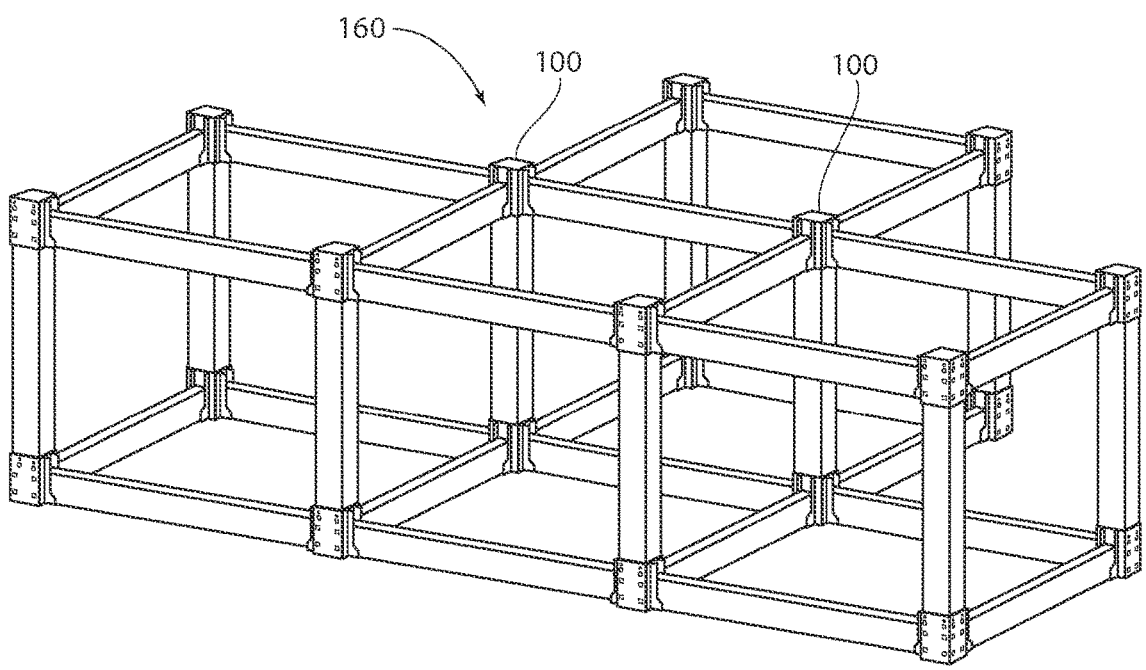
FIG. 15 depicts a further arrangement, e.g. a platform, formed according to the present invention.

The crate 60 could then be extended to a support structure, e.g. platform 160, as shown in FIGS. 13-15. In FIG. 13, an additional support arm 104 is added to the bracket assembly 100 by sliding the tab retainers 124 over the support tabs 122. Once in place, another support section 106 is attached to the bracket assembly and the support arm 104, as previously described. As demonstrated, the bracket assemblies may be preassembled or assembled during the course of construction a support structure. Eventually, the platform 160 as shown in FIG. 13 may be formed.

The platform 160 could be used as the basis for a stage, runway, or other similar structure. The bracket assemblies 100 are shown having various arrangements, with the ability to add onto the platform 160, if necessary, without having to deconstruct any of the sections of the platform 160. More support arms 104 will be added onto the outer bracket assemblies 100, as needed, which are depicted in phantom. This novel design allows a user to easily build any common freestanding structure in which the cross-supports, e.g. support sections 106, form the structures with only adaptation and addition of the bracket assemblies 100. Examples of potential applications include docks, decks, firewood racks, wood shipping crates, stages, dorm lofts, etc. Also, the bracket assemblies can be pre-assembled, e.g. the support arms 104 are attached to the inner support sleeve 102, before adding the cross-supports. When the brackets are pre-assembled without cross-supports, the bracket assembly 100 can be inverted/turned-upside-down without falling apart, which is something that is believed that cannot currently be done with prior art bracket systems. The bracket assembly of the present invention is designed for use with standard lumber sizes, e.g. 4×4, 2×4, and 2×6 sizes.

Figure 16:
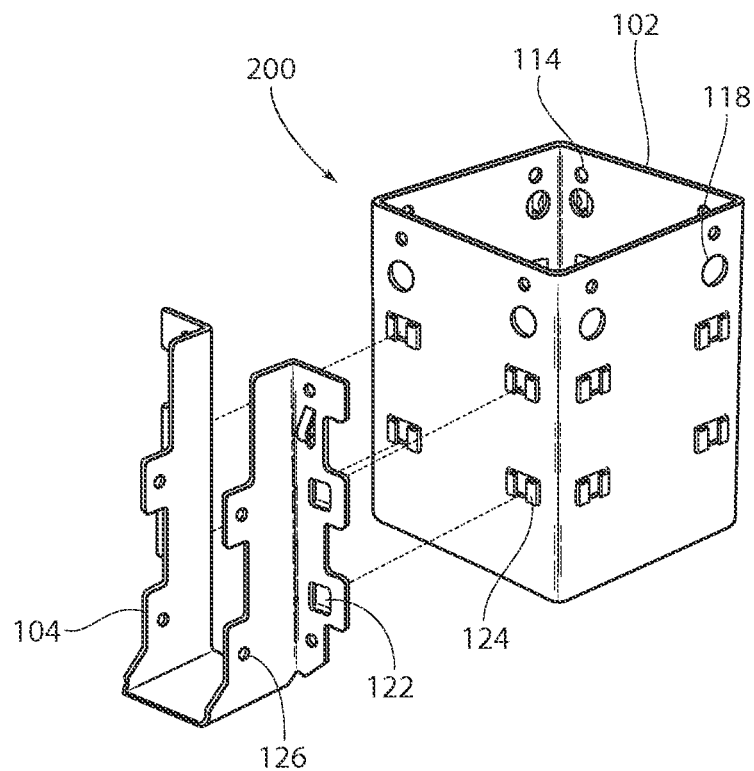
FIG. 16 provides an alternate arrangement of a bracket assembly according to the present invention.

Bracket assemblies according to the present invention comprise an inner support sleeve section and at least one support arm extending from the inner support sleeve section, with the two sections being secured to one another without the use of additional fasteners. For example, FIG. 16 contemplates a further arrangement of a bracket assembly 200 according to the present invention. The bracket assembly 200 is assembled similarly to the bracket assembly 100, wherein support tabs 122 and corresponding tab retainers 124 are used as previously described. However, the support tabs 122 are located on the support arm 104 and the tab retainers are located on the inner support sleeve 102. The interaction is similar to that in the bracket assembly 100.

Figure 17:
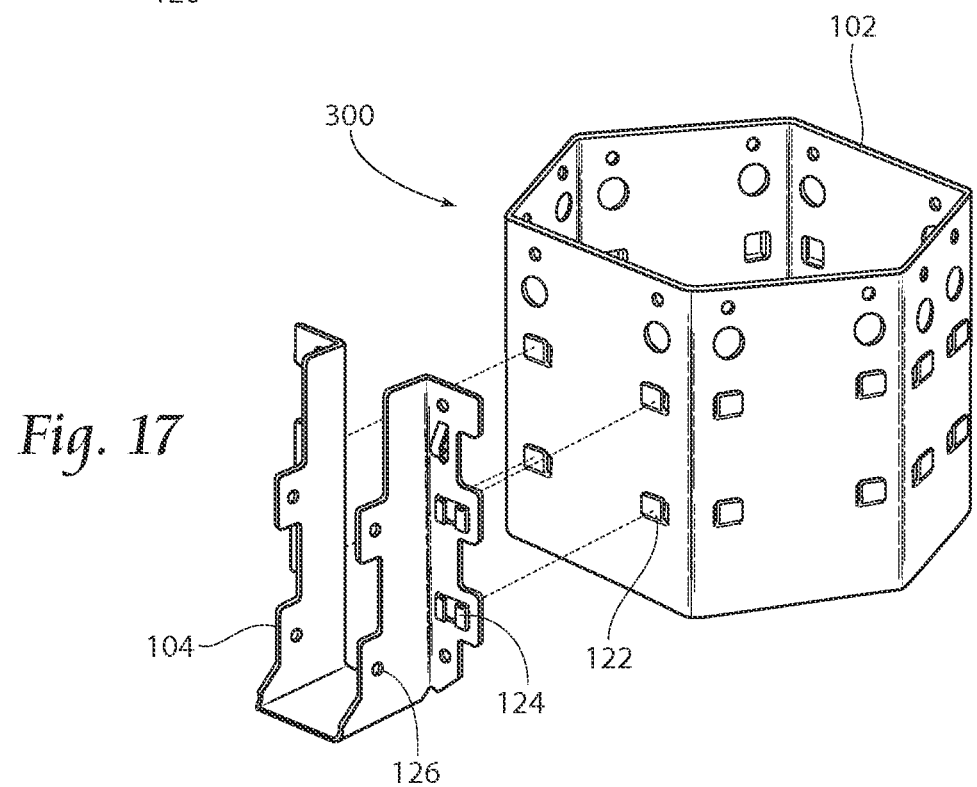
FIG. 17 is a further arrangement of a bracket assembly according to the present invention, wherein the bracket assembly has a hexagonal shape.

Also, the bracket assembly may undertake other geometric shapes. For example, FIG. 17 provides a hexagonal shaped bracket assembly 300, which may be useful in designing such structures as gazebos. The attachment principle, i.e. a support tab 122 interacting with tab retainers 124, is the same as with the previous embodiments. As such, FIG. 17 demonstrates the adaptability of the present invention for use in constructing and erecting a wide range of structures.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A bracket assembly for use in constructing a support frame including a plurality of supports, the bracket assembly comprising:
   a support sleeve configured to substantially surround one of the plurality of supports, the support sleeve including a plurality of positions, each position including a sleeve mounting feature and a deformable tab aperture;
   a plurality of support arms, each configured to receive one of the plurality of supports, and including an arm mounting feature arranged to engage one of the sleeve mounting features such that the support arm is removably coupled to the support sleeve, and further including a deformable tab configured to engage the corresponding support through the corresponding deformable tab aperture in the support sleeve; and
   a plurality of fasteners, each fastener engaged through one of the support arms, through the support sleeve, and configured to be fastened to the support that is surrounded by the support sleeve.

2. The bracket assembly of claim 1, wherein the sleeve mounting features include upwardly extending support tabs and the arm mounting features include tab retainers sized to receive the upwardly extending support tabs.

3. The bracket assembly of claim 2, wherein the upwardly extending support tabs are slidably receivable by the tab retainers.

4. The bracket assembly of claim 1, wherein each position of the support sleeve includes four sleeve mounting features.

5. The bracket assembly of claim 1, wherein the support sleeve includes four positions.

6. The bracket assembly of claim 1, wherein the arm mounting features include upwardly extending support tabs and the sleeve mounting features include tab retainers sized to receive the upwardly extending support tabs.

7. A bracket assembly for use in constructing a support frame including a primary support, and at least two secondary supports, the bracket assembly comprising:
 a support sleeve configured to substantially surround the primary support, the support sleeve including four positions, each position including a sleeve mounting feature and a deformable tab aperture;
 at least two support arms, each configured to receive one of the secondary supports, and including an arm mounting feature arranged to engage one of the sleeve mounting features such that the support arm is removably coupleable to the support, and further including a deformable tab configured to engage the corresponding support through the corresponding deformable tab aperture in the support sleeve; and
 a plurality of fasteners, each fastener engaged through one of the support arms, through the support sleeve, and configured to be fastened to the primary support.

8. The bracket assembly of claim 7, wherein the sleeve mounting features include upwardly extending support tabs and the arm mounting features include tab retainers sized to receive the upwardly extending support tabs.

9. The bracket assembly of claim 8, wherein the upwardly extending support tabs are slidably received by the tab retainers.

10. The bracket assembly of claim 7, wherein the arm mounting features include an upwardly extending support tabs and the sleeve mounting features include tab retainers sized to receive the upwardly extending support tabs.

11. The bracket assembly of claim 7, wherein the support sleeve is sized to receive a square primary support and the support arms are sized to receive an elongated secondary support.

12. The bracket assembly of claim 7, wherein each position of the support sleeve includes four sleeve mounting features.

13. A method of assembling a support frame that includes a plurality of supports and bracket assemblies, each bracket assembly including a support sleeve including a plurality of positions, each position including a sleeve mounting feature and a deformable tab aperture, and a plurality of support arms, each configured to receive one of the plurality of supports, and including an arm mounting feature and a deformable tab, the method comprising:
 engaging the support sleeve with one of the plurality of supports such that the support sleeve substantially surrounds the support;
 engaging the arm mounting features of one of the plurality of support arms with the sleeve mounting features in one position of one of the support sleeves;
 deforming the deformable tab such that a portion of the deformable tab passes through the deformable tab aperture and fastens into the support to secure the bracket to the support;
 securing the support sleeve to one of the plurality of supports engaging a fastener through one of the support arms, through the support sleeve, and into the support that is surrounded by the support sleeve; and
 engaging a second of the plurality of supports with the support arm.

14. The method of claim 13, further comprising engaging the arm mounting features of a second of the plurality of support arms with the sleeve mounting features in a second position of the support sleeve; and
 engaging a third of the plurality of supports with the second support arm.

15. The method of claim 14, further comprising engaging the arm mounting features of a third of the plurality of support arms with the sleeve mounting features in one position of a second support sleeve;
 securing the second support sleeve to a fourth of the plurality of supports; and
 engaging the third of the plurality of supports with the third support arm.

16. The method of claim 15, further comprising engaging the arm mounting features of a fourth of the plurality of support arms with the sleeve mounting features in a second position of the second support sleeve; and
 engaging a fifth of the plurality of supports with the fourth support arm.

17. The method of claim 16, further comprising engaging the arm mounting features of a fifth of the plurality of support arms with the sleeve mounting features in one position of a third support sleeve;
 securing the third support sleeve to a sixth of the plurality of supports; and
 engaging the fifth of the plurality of supports with the fifth support arm.

18. The method of claim 15, further comprising engaging the arm mounting features of a sixth of the plurality of support arms with the sleeve mounting features in a second position of the third support sleeve;
 engaging a seventh of the plurality of supports with the sixth support arm;
 engaging the arm mounting features of a seventh of the plurality of support arms with the sleeve mounting features in one position of a fourth support sleeve;
 securing the fourth support sleeve to an eighth of the plurality of supports;
 engaging the seventh of the plurality of supports with the seventh support arm;
 engaging the arm mounting features of an eighth of the plurality of support arms with the sleeve mounting features in a second position of the fourth support sleeve; and
 engaging the second of the plurality of supports with the eighth support arm.

* * * * *